United States Patent
Frenkel et al.

(10) Patent No.: US 12,321,414 B1
(45) Date of Patent: Jun. 3, 2025

(54) GENERATIVE AI TECHNIQUES FOR GENERATING A/B TESTING OF WEB CONTENT

(71) Applicant: Moonshot AI Inc, New York, NY (US)

(72) Inventors: Aviv Moshe Frenkel, Tel Aviv (IL); Evyatar Segal, Hoboken, NJ (US)

(73) Assignee: Moonshot AI Inc, New York, NY (US)

( * ) Notice: Subject to any disclaimer, the term of this patent is extended or adjusted under 35 U.S.C. 154(b) by 0 days.

(21) Appl. No.: 18/930,617

(22) Filed: Oct. 29, 2024

(51) Int. Cl.
*G06F 17/00* (2019.01)
*G06F 16/958* (2019.01)

(52) U.S. Cl.
CPC .................... *G06F 16/958* (2019.01)

(58) Field of Classification Search
CPC ...................................... G06F 16/958
See application file for complete search history.

(56) References Cited

U.S. PATENT DOCUMENTS

| | | | |
|---|---|---|---|
| 9,456,019 B2 * | 9/2016 | Zhang | G06F 11/3447 |
| 9,558,167 B2 * | 1/2017 | Yang | G06F 16/958 |
| 10,079,737 B2 | 9/2018 | Schlesinger et al. | |
| 10,565,385 B1 * | 2/2020 | Ravi | G06F 21/568 |
| 10,936,179 B2 | 3/2021 | Fitzpatrick | |
| 11,119,897 B2 | 9/2021 | Mordo et al. | |
| 11,243,867 B1 * | 2/2022 | Wexler | G06F 8/38 |
| 11,375,445 B2 | 6/2022 | Glusman et al. | |
| 11,907,168 B2 * | 2/2024 | Prahlad | G06Q 30/0206 |
| 11,949,750 B2 * | 4/2024 | Yavilevich | H04L 67/535 |
| 12,172,653 B1 * | 12/2024 | Akhtar | G08G 1/127 |
| 12,182,098 B1 * | 12/2024 | Ezrielev | G06F 16/2365 |
| 2010/0070872 A1 * | 3/2010 | Trujillo | G06F 3/04892 715/745 |
| 2011/0197124 A1 * | 8/2011 | Garaventa | G06F 16/972 715/234 |
| 2012/0010995 A1 * | 1/2012 | Skirpa | G06F 16/9577 705/14.49 |
| 2012/0047206 A1 * | 2/2012 | Hamzeh | G06F 9/44526 709/217 |
| 2016/0212231 A1 * | 7/2016 | Martha | G06Q 30/02 |
| 2017/0344656 A1 * | 11/2017 | Koren | G06Q 10/101 |

(Continued)

FOREIGN PATENT DOCUMENTS

| | | | | |
|---|---|---|---|---|
| WO | WO-2006099105 A2 * | 9/2006 | | G06F 16/3325 |
| WO | WO-2020226819 A1 * | 11/2020 | | G06F 16/176 |

(Continued)

*Primary Examiner* — Laurie A Ries
(74) *Attorney, Agent, or Firm* — M&B IP Analysts, LLC

(57) ABSTRACT

A system and method for improving traffic of a webpage is presented. The method includes receiving a first plurality of activity records respective of a webpage, the webpage including a plurality of content objects, each content object including a markup language code; generating a first metric value based on the first plurality of activity records; generating an alternative webpage based on the plurality of content objects; generating a second metric value based on a second plurality of activity records respective of the alternative webpage; generating a second alternative webpage in response to determining that the second metric value is lower than the first metric value; and replacing the webpage with the alternative webpage, in response to determining that the second metric value is higher than the first metric value.

23 Claims, 5 Drawing Sheets

(56) References Cited

U.S. PATENT DOCUMENTS

| | | |
|---|---|---|
| 2020/0351363 A1 | 11/2020 | Yavilevich |
| 2021/0081467 A1* | 3/2021 | Chawla .................. G06F 40/30 |
| 2022/0043879 A1* | 2/2022 | Trigalo ................. G06F 40/166 |
| 2022/0067111 A1* | 3/2022 | Diaz .................. G06Q 30/0201 |
| 2022/0129509 A1* | 4/2022 | Yu ........................ G06F 40/117 |
| 2022/0239752 A1 | 7/2022 | Reshef et al. |
| 2023/0195610 A1 | 6/2023 | Young |
| 2023/0409662 A1* | 12/2023 | Hulick, Jr. .............. H04L 67/02 |
| 2024/0378656 A1* | 11/2024 | He ..................... G06Q 30/0639 |

FOREIGN PATENT DOCUMENTS

| | | | | |
|---|---|---|---|---|
| WO | WO-2020229635 A1 * | 11/2020 | .......... | G06F 11/3419 |
| WO | WO-2021056000 A1 * | 3/2021 | ......... | G06F 16/9574 |

\* cited by examiner

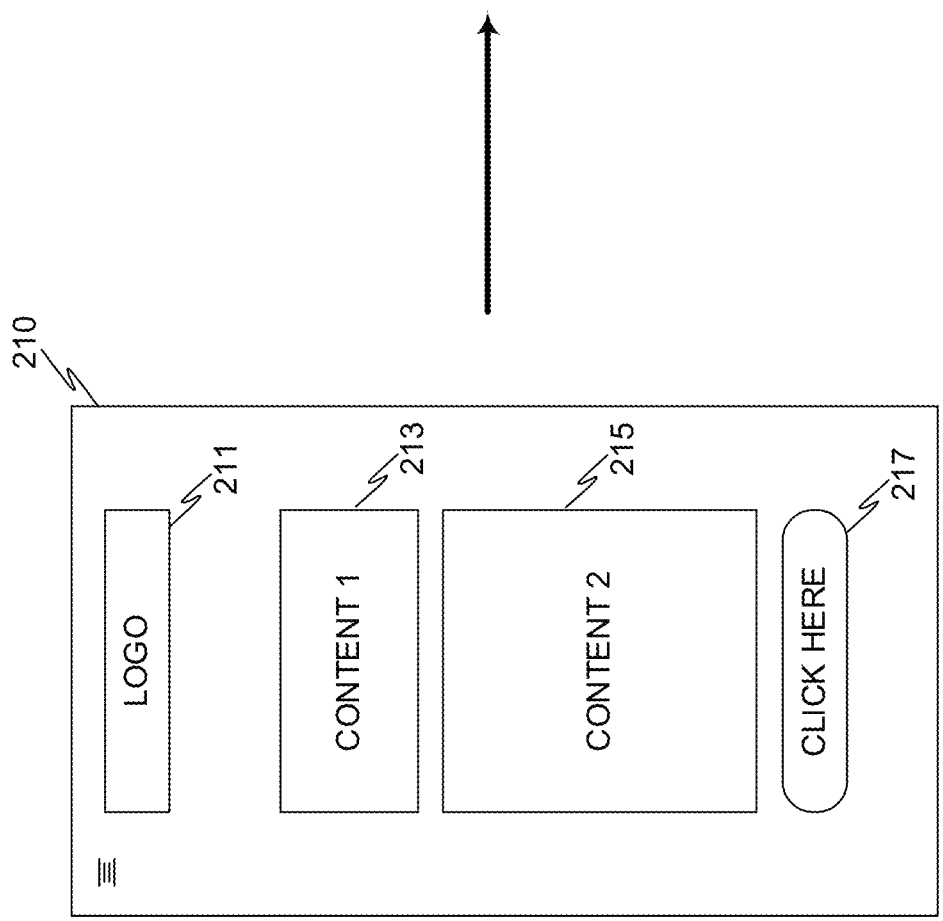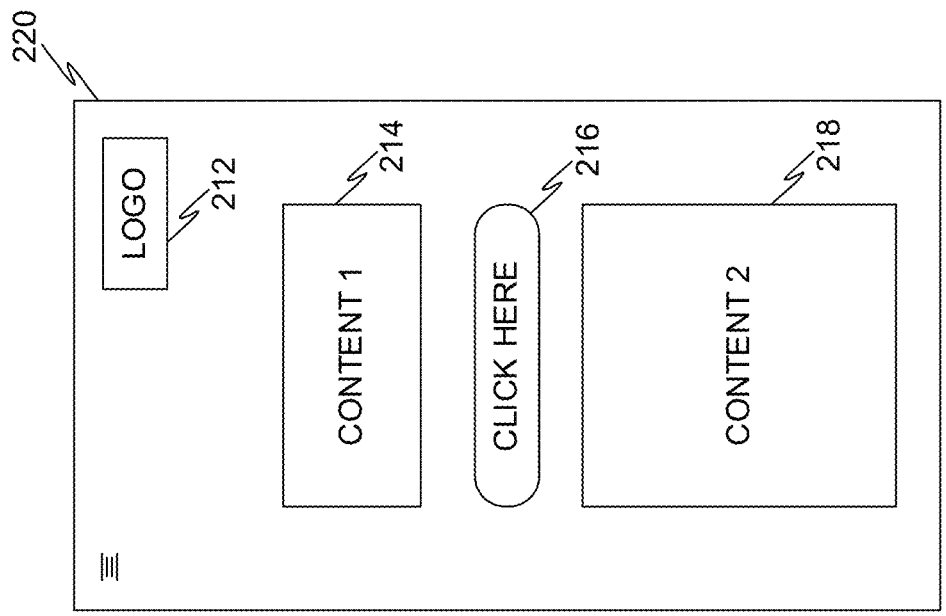
FIGURE 2

GENERATIVE AI TECHNIQUES FOR GENERATING A/B TESTING OF WEB CONTENT

TECHNICAL FIELD

The present disclosure relates generally to web content provisioning, and specifically to improving generation of web content to increase provision efficiency.

BACKGROUND

A/B testing for web pages is a method used to compare two versions of a page's content to determine which one performs better in achieving a specific goal, such as clicks, conversions, or engagement. It involves splitting the audience into two groups: one sees version A (the original), and the other sees version B (a modified version). Metrics from both versions are analyzed to identify which variation leads to better outcomes.

Creating engaging content is challenging because user preferences and behaviors can be unpredictable and vary widely. What works for one audience segment might not resonate with another, and assumptions about design, messaging, or layout may not align with actual user behavior. The complexity increases because content must capture attention quickly, sustain interest, and prompt specific actions, all within a competitive digital landscape.

A/B testing addresses this challenge by providing data-driven insights. Rather than relying on guesswork, it allows businesses to experiment with changes in a controlled way, testing different headlines, images, buttons, or layouts. By analyzing user interactions with both versions, companies can identify which elements resonate better with their audience and improve the effectiveness of their content incrementally.

However, A/B testing presents certain limitations. One issue is the local maxima problem, where small, incremental changes may improve results, but the testing framework may fail to discover entirely new, superior approaches because it only refines existing designs. Additionally, statistical noise and biases can skew results, especially if sample sizes are small or if external factors such as seasonal trends, current events, etc., affect user behavior during the test, leading to unreliable conclusions.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include receiving a first plurality of activity records respective of a webpage, the webpage including a plurality of content objects, each content object including a markup language code. The method may also include generating a first metric value based on the first plurality of activity records. The method may furthermore include generating an alternative webpage based on the plurality of content objects. The method may in addition include generating a second metric value based on a second plurality of activity records respective of the alternative webpage. The method may moreover include generating a second alternative webpage in response to determining that the second metric value is lower than the first metric value. The method may also include replacing the webpage with the alternative webpage, in response to determining that the second metric value is higher than the first metric value. Other embodiments of this aspect include corresponding computer systems, apparatus, and computer programs recorded on one or more computer storage devices, each configured to perform the actions of the methods.

Implementations may include one or more of the following features. The method where generating the alternative webpage further may include: modifying the markup language code of at least a content object of the plurality of content objects. The method may include: generating a prompt for a large language model (LLM) of a generative AI system, the prompt generated based on a predetermined template and the plurality of content objects; and processing the generated prompt utilizing the LLM to generate the alternative webpage. The method may include: generating a context for the LLM based on any one of the first plurality of activity records, the second plurality of activity records, and a combination thereof. The method where generating the alternative webpage further may include: modifying a content object of the plurality of content objects. The method may include: detecting a value in the markup language code of the content object; and generating a new content object based on modifying the value of the markup language code. The method may include: detecting in an activity record an user session. The method where the user session includes any one of: a number of webpages visited, an amount of time spent on each webpage, an interaction with a content object, a session ID, a heatmap, and any combination thereof. The method may include: generating the first metric value to detect a conversion rate between interaction with a first content and interaction with a second content, where the interaction with the second content is subsequent to the interaction with the first content. The method may include: generating a benchmark value; and generating the alternative webpage in response to determining that the first metric value is below the benchmark value. The method may include: generating the benchmark value based on another webpage including content which is semantically similar to a content object of the plurality of content objects. The method may include: determining that the another webpage is semantically similar to the webpage in response to detecting that a semantic distance between the content and the content object is below a predetermined threshold. Implementations of the described techniques may include hardware, a method or process, or a computer tangible medium.

In one general aspect, non-transitory computer-readable medium may include one or more instructions that, when executed by one or more processors of a device, cause the device to: receive a first plurality of activity records respective of a webpage, the webpage including a plurality of content objects, each content object including a markup language code; generate a first metric value based on the first plurality of activity records; generate an alternative webpage based on the plurality of content objects; generate a second metric value based on a second plurality of activity records respective of the alternative webpage; generate a second alternative webpage in response to determining that the second metric value is lower than the first metric value; and replace the webpage with the alternative webpage, in response to determining that the second metric value is higher than the first metric value. Other embodiments of this aspect include corresponding computer systems, apparatus, and computer programs recorded on one or more computer storage devices, each configured to perform the actions of the methods.

In one general aspect, system may include one or more processors receive a first plurality of activity records respective of a webpage, the webpage including a plurality of content objects, each content object including a markup language code. The system may furthermore generate a first metric value based on the first plurality of activity records. The system may in addition generate an alternative webpage based on the plurality of content objects. The system may moreover generate a second metric value based on a second plurality of activity records respective of the alternative webpage. The system may also generate a second alternative webpage in response to determining that the second metric value is lower than the first metric value. The system may furthermore replace the webpage with the alternative webpage, in response to determining that the second metric value is higher than the first metric value. Other embodiments of this aspect corresponding computer systems, apparatus, and computer programs recorded on one or more computer storage devices, each configured to perform the actions of the methods.

Implementations may include one or more of the following features. The system where the one or more processors, when generating the alternative webpage, are configured to: modify the markup language code of at least a content object of the plurality of content objects. The system where the one or more processors are further configured to: generate a prompt for a large language model (LLM) of a generative AI system, the prompt generated based on a predetermined template and the plurality of content objects; and process the generated prompt utilizing the LLM to generate the alternative webpage. The system where the one or more processors are further configured to: generate a context for the LLM based on any one of: the first plurality of activity records, the second plurality of activity records, and a combination thereof. The system where the one or more processors, when generating the alternative webpage, are configured to: modify a content object of the plurality of content objects. The system where the one or more processors are further configured to: detect a value in the markup language code of the content object; and generate a new content object based on modifying the value of the markup language code. The system where the one or more processors are further configured to: detect in an activity record an user session. The system where the user session includes any one of: a number of webpages visited, an amount of time spent on each webpage, an interaction with a content object, a session ID, a heatmap, and any combination thereof. The system where the one or more processors are further configured to: generate the first metric value to detect a conversion rate between interaction with a first content and interaction with a second content, where the interaction with the second content is subsequent to the interaction with the first content. The system where the one or more processors are further configured to: generate a benchmark value; and generate the alternative webpage in response to determining that the first metric value is below the benchmark value. The system where the one or more processors are further configured to: generate the benchmark value based on another webpage including content which is semantically similar to a content object of the plurality of content objects. The system where the one or more processors are further configured to: determine that the another webpage is semantically similar to the webpage in response to detecting that a semantic distance between the content and the content object is below a predetermined threshold. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example graphical user interface of a web content and an alternative web content, utilized to describe an embodiment.

DETAILED DESCRIPTION

Figure 1:
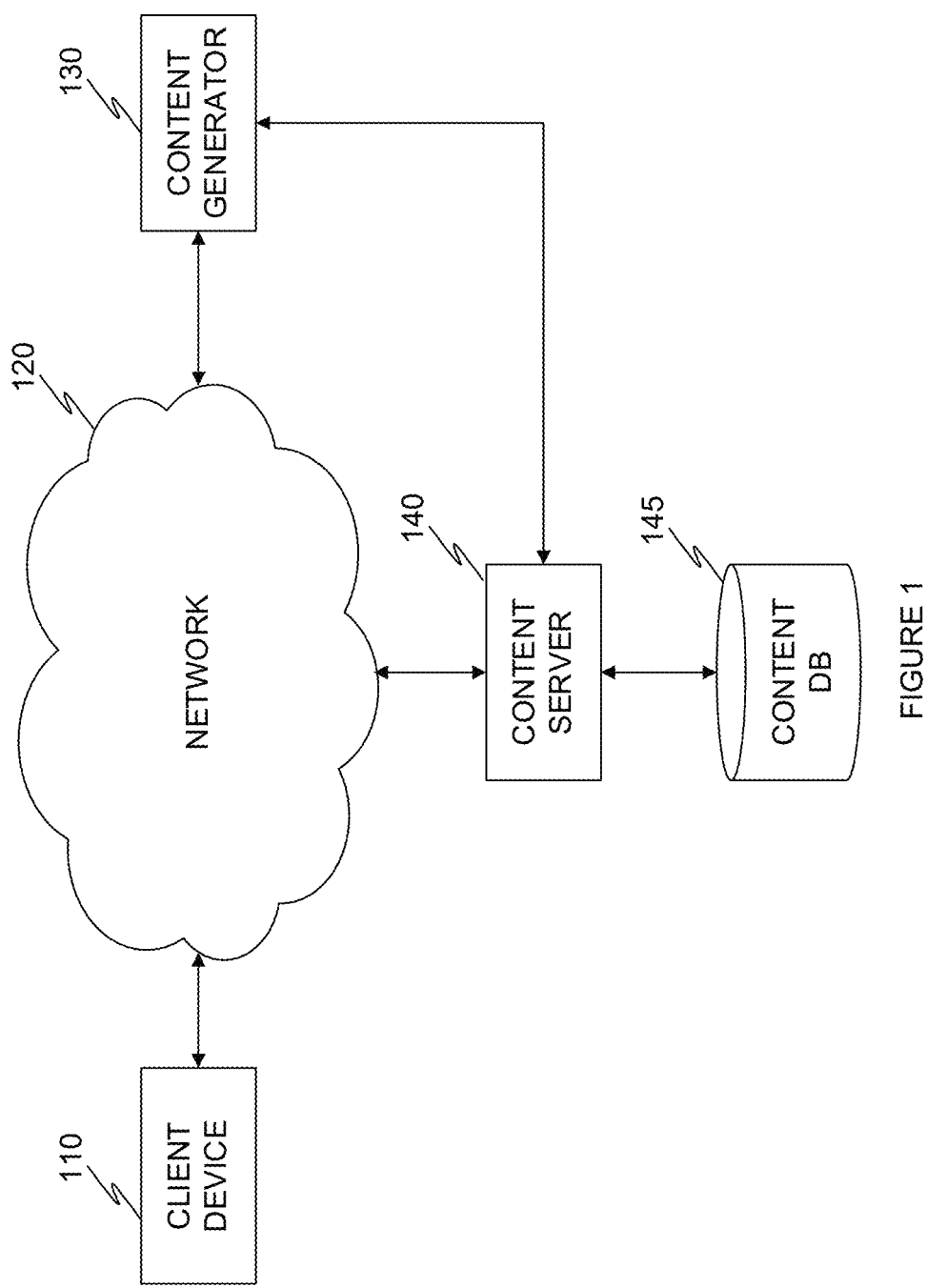
FIG. 1 is an example network diagram of a content generator providing content for a content server, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example network diagram of a content generator providing content for a content server, utilized to describe an embodiment. In an embodiment, a content server 140 is configured to provide web content over a network 120. A content server 140 includes, for example, a web server application, a proxy server application, a load balancer application, a combination thereof, and the like.

In an embodiment, a web server application is implemented for example using Nginx®. In an embodiment, the content server 140 is configured to generate web content, for example from a plurality of contents stored on a content database 145. According to an embodiment, a content is a text, a graphic, a video, a graphical user interface (GUI) element, a combination thereof, and the like.

In an embodiment, a client device 110 requests a web content from the content server 140 over the network 120. In an embodiment, the network 120 includes a wireless, cellular or wired network, a local area network (LAN), a wide area network (WAN), a metro area network (MAN), the Internet, the worldwide web (WWW), similar networks, and any combination thereof.

In some embodiments, the client device 110 is a personal computer, a laptop, a tablet computer, a smartphone, a wearable computing device, an internet of things (IoT) device, a device capable of receiving and displaying notifications, a combination thereof, and the like.

According to an embodiment, it is advantageous to provide a user of the client device 110 with a content which they are likely to interact with. For example, it is advantageous in certain embodiments to provide a user of the client device 110 with a web page where the user is more likely to initiate a transaction, request additional content, engage with a web content, a combination thereof, and the like.

However, a provider of the web content may not always supply the content in the most engaging way possible. Furthermore, different users may interact and respond differently to content depending on how it is presented.

In an embodiment, a client device 110 and a content server 140 are configured to engage in an activity session. For example, an activity session may include a transfer of requests from the client device 110 to the content server 140, a transfer of content from the content server 140 to the client device, network packets, data packets, an action initiated by the client device 110, a combination thereof, and the like.

For example, in an embodiment, an activity session includes a plurality of requests for content, an interaction of a user based on the received content, and the like. In an embodiment, the activity session is generated by a customer engagement platform (not shown) which is configured to generate a heatmap, detect behavior, perform behavior analysis, capture user interaction, detect user usage pattern, a combination thereof, and the like.

According to an embodiment, a content generator 130 is configured to determine a metric, a plurality of metrics, etc., to apply based on activity records. For example, in an embodiment, a metric is time based, e.g., to increase time spent on a website by a certain threshold. In certain embodiments, the metric is engagement based, e.g., to increase an amount of users which interact with follow-on content.

In an embodiment, the content generator 130 is further configured to cluster activity sessions. For example, the content generator 130 is configured, in an embodiment, to generate clusters of activity sessions based on a predetermined value, range of values, etc., of an attribute of an activity session.

In certain embodiments, the content generator 130 is configured to receive, access, etc., content from the content database 145, and generate a web content (e.g., an HTML page) for providing a client device 110. In an embodiment, the content generator 130 is configured to generate the web content further based on a metric objective. In some embodiments, the content generator 130 is configured to generate a unique web content for each generated cluster.

According to an embodiment, the content generator 130 is further configured to generate a web content by utilizing a generative artificial intelligence (AI) model. In an embodiment, the generative AI model includes a generative adversarial network (GAN), a general pre-trained transformer (GPT), a BART model, a LLaMa model, a language model (e.g., a large language model, a small language model, etc.), a multimodal generative AI, a combination thereof, and the like.

In an embodiment, the content generator 130 is configured to generate a prompt for the generative AI model. For example, in an embodiment, the prompt includes an instruction to generate a web content based on a content accessed from the content database 145, a constraint based on a determined metric, a prompt template, a combination thereof, and the like. In an embodiment, the content generator 130 is configured to selected a prompt template from a plurality of prompt templates based, for example, on a classification of the content from the content database 145.

In some embodiments, the content generator 130 is configured to generate a plurality of web contents, each web content generated based on the same content accessed from the content database 145. In an embodiment, a plurality of activity sessions are received by the content generator 130, each activity session associated with a web content, each web content generated based on the same content of the content database 145.

For example, in an embodiment, a first plurality of activity sessions is associated with a first web content, and the content generator 130 is configured to generate a first metric value based on the first plurality of activity sessions. In an embodiment, a second plurality of activity sessions is associated with a second web content, generated based on the same content of the first web content, and having a second metric value based on the second plurality of activity sessions.

In some embodiments, the content generator 130 is configured to further generate a benchmark metric value, for example based on a plurality of web pages which are semantically similar to a web page hosting the first web content. In an embodiment, the content generator 130 is further configured to detect a semantic similarity between a first web page including a first web content, and a second web page including a second web content. In an embodiment, the first web page is associated with a first domain, and the second web page is associated with a second domain.

For example, according to an embodiment, a semantic score is determined for each web content pair (e.g., a first web content and a second web content), utilizing cosine similarity, Euclidean distance, Manhattan distance, KL divergence, a combination thereof, and the like.

In an embodiment, semantic similarity is determined based on a word embedding model, such as Word2Vec, GloVe, and the like. In certain embodiments, semantic similarity is determined by utilizing a contextual embedding model, such as a bidirectional encoder representation from transformer (BERT) model, a generative pre-trained transformer (GPT) model, and the like.

In an embodiment, the content generator 130 is configured to generate a modified web content, for example by modifying a markup language associated with a content, associated with an object, etc. In an embodiment, modifying a markup language includes detecting a markup language document having a plurality of data fields, and modifying a value of a data field to another value.

In an embodiment, it is advantageous to determine a benchmark value for a web page, a web content, and the like, based on semantically similar web pages. According to some embodiments, this allows for A/B testing of web content based on a benchmark of established web pages, for example, without requiring access other than what is publicly available.

FIG. 2 is an example graphical user interface of a web content and an alternative web content, utilized to describe an embodiment. In an embodiment, a web page (or web content) is displayed on a first display 210. For example, in an embodiment, the first display 210 is of a mobile device, such as a tablet, smartphone, and the like.

In an embodiment, the first display 210 includes a first logo 211, a first content 213, a second content 215, and an interface button 217. In an embodiment, the first logo 211 is a static picture (e.g., a PNG file, a JPEG file, etc.), the first content 213 is a text content, the second content 215 is a text content including a hyperlink, and the interface button 217 is a combination of a graphical user interface element (e.g., a picture) which is configured to be interacted with, for example by clicking the interface button 217.

According to an embodiment, a content generator is configured to generate a second web page (or web content) for displaying on a second display 220. In an embodiment, the second display 220 includes a second logo 212 which corresponds to the first logo 211, a first content 214 which corresponds to content 213, an interface button 216 which corresponds to interface button 217, and a second content 218 which corresponds to second content 215.

In an embodiment, the interface button 216 and the interface button 217 are placed in different positions relative to their respective displays. In some embodiments, the second content 215 and second content 218 are likewise placed in different positions relative to their respective displays. In an embodiment, the first logo 211 is displayed relatively larger than the second logo 212.

In certain embodiments, the content generator is configured to generate the web page for the second display 220 for example by modifying content, modifying a position of the content, modifying a color of the content, modifying a font of a textual content, modifying a size of the content, a combination thereof, and the like.

In some embodiments, the content generator is configured to modify a textual content utilizing a generative AI model. For example, in an embodiment, the content generator is configured to utilize a prompt for a generative AI model including the textual content, wherein the prompt, when processed with the textual content by the generative AI model, outputs a second textual content based on the textual content, wherein the second textual content is different in tone (e.g., more professional), in style, in length, in brevity, etc.

Figure 3:
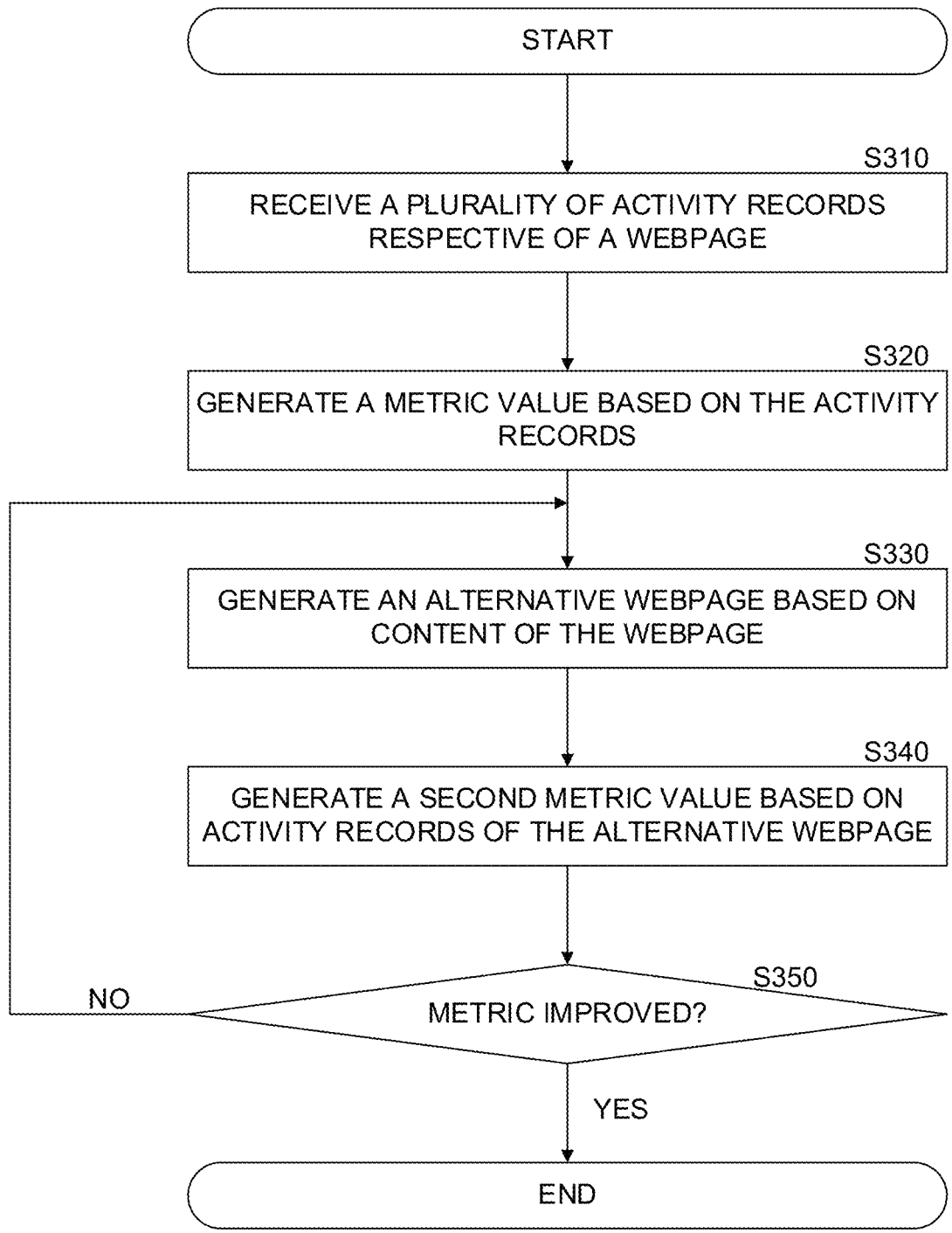
FIG. 3 is an example flowchart of a method for performing A/B testing of web content, implemented in accordance with an embodiment.

FIG. 3 is an example flowchart of a method for performing A/B testing of web content, implemented in accordance with an embodiment. According to an embodiment, performing A/B testing of web content allows to identify content which is more engaging for a user, thereby increasing its value. Furthermore, it is advantageous to perform A/B testing from a compute perspective, to determine what content can be provided which requires less processing, less memory utilization, etc.

At S310, a plurality of activity records are received. In an embodiment, an activity record includes a user session, a plurality of user sessions, and the like. For example, in an embodiment, a user session includes a request for a content, such as by providing a uniform resource locator (URL), a uniform resource identifier (URI), and the like.

In an embodiment, the user session includes content which is provided, such as digital pictures (e.g., a JPEG file, a GIF file, a PNG file, etc.), a video file, an audio file, a text, a hypertext document, a combination thereof, and the like.

In some embodiments, a user session includes an identifier of a unique session, an identifier of a unique user, a combination thereof, and the like. In certain embodiments, a user identifier is, for example, a token, a credential, and the like. In an embodiment, a user session includes a number of webpages visited, a domain identifier, a sub-domain identifier, an origin IP address, a destination IP address, a heatmap, an interaction with a content, a combination thereof, and the like.

In an embodiment, an activity record is associated with a web page, a web content, a plurality of web pages, a domain, a sub-domain, a plurality of domains, a plurality of sub-domains, a combination thereof, and the like. In an embodiment, activity records are received continuously, periodically, etc.

At S320, a metric value is generated. In an embodiment, a metric is selected based on a content, on an activity record associated with a content, on a web page, a combination thereof, and the like.

In an embodiment, generating a metric value includes detecting in a plurality of activity records metric values. In some embodiments, the metric values are generated based on values detected in the activity records. For example, in an embodiment, the metric is an average time spent on a webpage. In such an example, a plurality of activity records each include a value indicating time spent on a web page. An average time spent is generated based on the plurality of values each indicating time spent on the web page.

In an embodiment, a plurality of metric values are generated, each for a unique metric. In some embodiments, a metric value is generated continuously, periodically, etc. According to an embodiment, a metric value is stored with a time stamp, temporal indicator, and the like. In an embodiment, the metric value is generated for an activity record, for a plurality of activity records, etc., which are related to a single web page, a plurality of associated web pages, and the like. For example, in an embodiment, an 'index.html' and 'index.htm' are associated web pages. An associated web page is a web page which is identical, similar, substantially similar, etc., to another web page.

At S330, an alternative web page is generated. In an embodiment, generating an alternative web page is performed based on content of an original (e.g., a first) web page. In some embodiments, a plurality of alternative web pages are generated, each unique and all based on content of the original web page.

In certain embodiments, a content generator is configured to generate the alternative web page. In an embodiment, the content generator is configured to analyze the original web page to detect therein a content, a location of a content, etc., and access such content to generate the alternative web page. For example, in an embodiment, the content generator is configured to detect a digital image by searching an HTML file for an a ". JPG" regex, a ".PNG" regex, etc.

In an embodiment, in response to detecting the digital image, the content generator is configured to detect an "href" regex proximate to the digital image indicator, which in turn indicates where the digital image is stored, for example as a URI.

In some embodiments, detecting the content and accessing the content allows the content generator to then generate an alternative web page based on the content, on attributes of the content, a combination thereof, and the like.

In an embodiment, the content generator includes a generative AI model which is configured to receive a content, a constraint, a prompt, a prompt template, a metric value, a metric threshold, a combination thereof, and the like, and generate the alternative web page based on the same.

According to an embodiment, the content generator is configured to generate modified content. For example, in an embodiment, modified content includes content which is resized. In some embodiments, a text content is modified into a modified text content utilizing a generative AI model such as a transformer model configured to generate text content. In certain embodiments, the content generator includes a multimodal generative AI which is configured to generate modified images based on an image content, modified text based on a text content, a combination thereof, and the like.

In certain embodiments, the alternative web page includes markup language content, such as an HTML document, which is modified based on an attribute detected in the markup language content.

At S340 a second metric value is generated. In an embodiment, the second metric value is generated based on a second plurality of activity records. According to an embodiment, the second plurality of activity records are received respective of the alternative web page.

In an embodiment, the second metric value is generated for the same metric as the first metric value. For example, in an embodiment, where a plurality of first metric values are generated, each for a unique metric, a plurality of second metric values are generated to correspond to each metric value of the plurality of first metric values.

In certain embodiments, where a plurality of alternative web pages are generated, a second metric value, a plurality of second metric values, etc., are generated for each alternative web page of the plurality of alternative web pages.

At S350, a check is performed to determine if the metric improved. In an embodiment, a metric is considered improved in response to a target objective. For example, according to an embodiment, a metric is improved in response to determining that a second metric value exceeds a first metric value by a predetermined amount, by a predetermined percentage, etc.

In some embodiments, a metric is considered improved where the first metric value exceeds the second metric value. In an embodiment, a metric is considered improved in response to determining that the second metric value exceeds a predetermined threshold, is below a predetermined threshold, is between a first threshold value and a second threshold value, and the like.

In an embodiment, where the check determines that the metric is not improved, execution may continue at S330. In some embodiments, in response to determining that the metric improved, execution ends.

In some embodiments, a notification, an alert, and the like, are generated in response to determining a value of the metric improvement.

Figure 4:
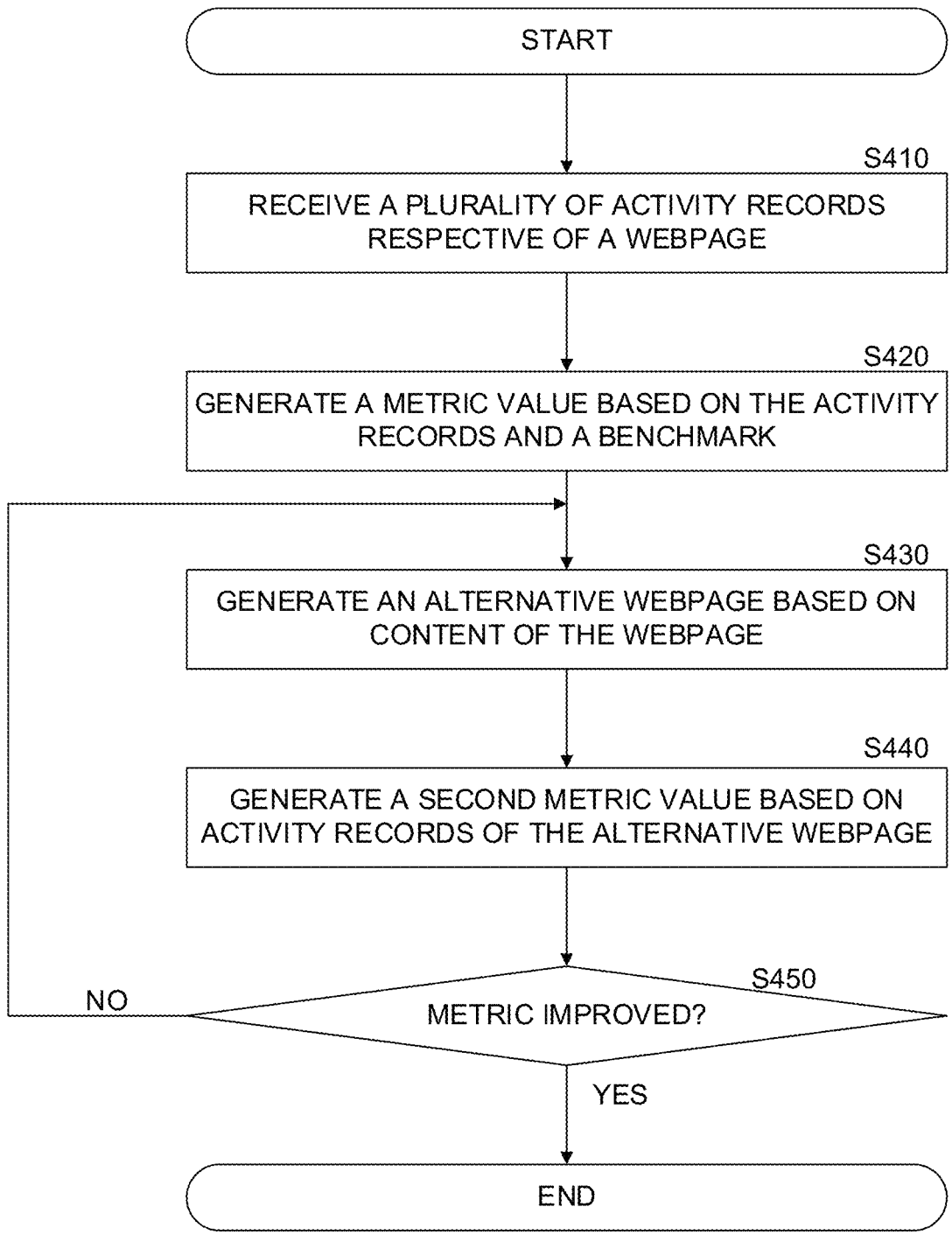
FIG. 4 is an example flowchart of a method for performing benchmark testing of web content, implemented in accordance with an embodiment.

FIG. 4 is an example flowchart of a method for performing benchmark testing of web content, implemented in accordance with an embodiment. According to an embodiment, performing benchmark testing of web content allows to identify content which is more engaging for a user, thereby increasing its value. Furthermore, it is advantageous to perform benchmark testing from a compute perspective, to determine what content can be provided which requires less processing, less memory utilization, etc. In addition, benchmarking content based on semantically similar web pages provides for an increased user experience.

At S410, a plurality of activity records are received. In an embodiment, an activity record includes a user session, a plurality of user sessions, and the like. For example, in an embodiment, a user session includes a request for a content, such as by providing a uniform resource locator (URL), a uniform resource identifier (URI), and the like.

In an embodiment, the user session includes content which is provided, such as digital pictures (e.g., a JPEG file, a GIF file, a PNG file, etc.), a video file, an audio file, a text, a hypertext document, a combination thereof, and the like.

In some embodiments, a user session includes an identifier of a unique session, an identifier of a unique user, a combination thereof, and the like. In certain embodiments, a user identifier is, for example, a token, a credential, and the like. In an embodiment, a user session includes a number of webpages visited, a domain identifier, a sub-domain identifier, an origin IP address, a destination IP address, a heatmap, an interaction with a content, a combination thereof, and the like.

In an embodiment, an activity record is associated with a web page, a web content, a plurality of web pages, a domain, a sub-domain, a plurality of domains, a plurality of sub-domains, a combination thereof, and the like. In an embodiment, activity records are received continuously, periodically, etc.

At S420, a metric value is generated. In an embodiment, a metric is selected based on a content, on an activity record associated with a content, on a web page, a combination thereof, and the like.

In an embodiment, generating a metric value includes detecting in a plurality of activity records metric values. In some embodiments, the metric values are generated based on values detected in the activity records. For example, in an embodiment, the metric is an average time spent on a webpage. In such an example, a plurality of activity records each include a value indicating time spent on a web page. An average time spent is generated based on the plurality of values each indicating time spent on the web page.

In an embodiment, a plurality of metric values are generated, each for a unique metric. In some embodiments, a metric value is generated continuously, periodically, etc. According to an embodiment, a metric value is stored with a time stamp, temporal indicator, and the like. In an embodiment, the metric value is generated for an activity record, for a plurality of activity records, etc., which are related to a single web page, a plurality of associated web pages, and the like. For example, in an embodiment, an 'index.html' and 'index.htm' are associated web pages. An associated web page is a web page which is identical, similar, substantially similar, etc., to another web page.

According to an embodiment, the metric value is generated further based on a benchmark value. In an embodiment, a benchmark value is generated by detecting a semantically similar web page, a plurality of semantically similar web pages, and the like, and generating a benchmark value based on an attribute thereof.

For example, in an embodiment, a content generator is configured to detect a semantically similar web page to a web page for which the first plurality of activity records are received. In an embodiment, detecting a semantically similar web page includes generating a semantic similarity score between the web page and another web page. In some embodiments, semantic similarity is determined based on text content, graphic content, a combination thereof, and the like.

In an embodiment, semantic similarity is detected utilizing a word embedding model, such as Word2Vec, GloVe, and the like. In certain embodiments, semantic similarity is determined by utilizing a contextual embedding model, such as a bidirectional encoder representation from transformer (BERT) model, a generative pre-trained transformer (GPT) model, and the like.

At S330, an alternative web page is generated. In an embodiment, generating an alternative web page is performed based on content of an original (e.g., a first) web page. In some embodiments, a plurality of alternative web pages are generated, each unique and all based on content of the original web page.

In certain embodiments, a content generator is configured to generate the alternative web page. In an embodiment, the content generator is configured to analyze the original web page to detect therein a content, a location of a content, etc., and access such content to generate the alternative web page. For example, in an embodiment, the content generator is configured to detect a digital image by searching an HTML file for an a ". JPG" regex, a ".PNG" regex, etc.

In an embodiment, in response to detecting the digital image, the content generator is configured to detect an "href" regex proximate to the digital image indicator, which in turn indicates where the digital image is stored, for example as a URI.

In some embodiments, detecting the content and accessing the content allows the content generator to then generate an alternative web page based on the content, on attributes of the content, a combination thereof, and the like.

In an embodiment, the content generator includes a generative AI model which is configured to receive a content, a constraint, a prompt, a prompt template, a metric value, a metric threshold, a combination thereof, and the like, and generate the alternative web page based on the same.

According to an embodiment, the content generator is configured to generate modified content. For example, in an embodiment, modified content includes content which is resized. In some embodiments, a text content is modified into a modified text content utilizing a generative AI model such as a transformer model configured to generate text content. In certain embodiments, the content generator includes a multimodal generative AI which is configured to generate modified images based on an image content, modified text based on a text content, a combination thereof, and the like.

In certain embodiments, the alternative web page includes markup language content, such as an HTML document, which is modified based on an attribute detected in the markup language content.

In an embodiment, the content generator is configured to generate the alternative web page based on the content and additionally based on the benchmark. For example, in an embodiment, the content generator is configured to generate the alternative web page based on a text content which is modified based on the benchmark for textual content, which indicates that text should not exceed 400 words.

At S440 a second metric value is generated. In an embodiment, the second metric value is generated based on a second plurality of activity records. According to an embodiment, the second plurality of activity records are received respective of the alternative web page.

In an embodiment, the second metric value is generated for the same metric as the first metric value. For example, in an embodiment, where a plurality of first metric values are generated, each for a unique metric, a plurality of second metric values are generated to correspond to each metric value of the plurality of first metric values.

In certain embodiments, where a plurality of alternative web pages are generated, a second metric value, a plurality of second metric values, etc., are generated for each alternative web page of the plurality of alternative web pages.

At S450, a check is performed to determine if the metric improved. In an embodiment, a metric is considered improved in response to a target objective. For example, according to an embodiment, a metric is improved in response to determining that a second metric value exceeds a first metric value by a predetermined amount, by a predetermined percentage, etc.

In some embodiments, a metric is considered improved where the first metric value exceeds the second metric value. In an embodiment, a metric is considered improved in response to determining that the second metric value exceeds a predetermined threshold, is below a predetermined threshold, is between a first threshold value and a second threshold value, and the like. In an embodiment, where the check determines that the metric is not improved, execution may continue at S430. In some embodiments, in response to determining that the metric improved, execution ends.

In some embodiments, a notification, an alert, and the like, are generated in response to determining a value of the metric improvement.

Figure 5:
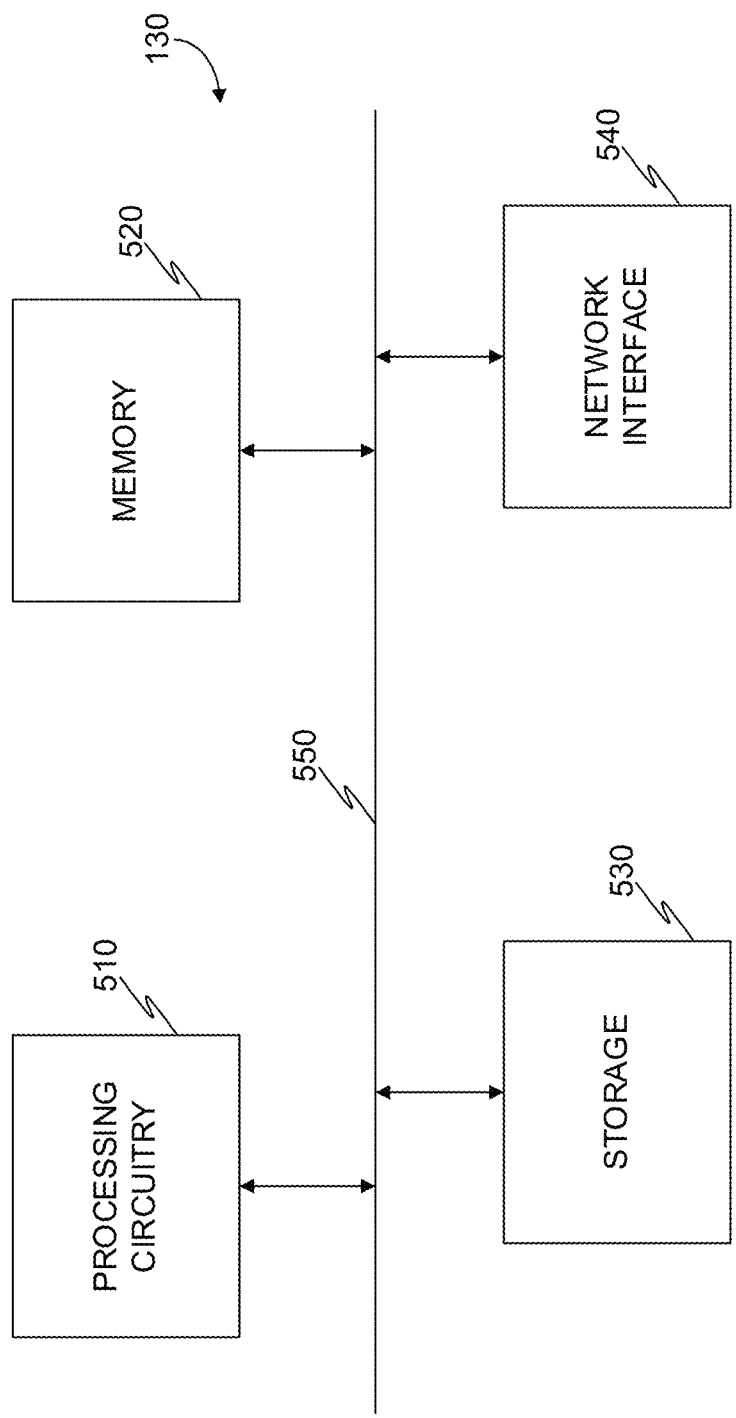
FIG. 5 is an example schematic diagram of a content generator according to an embodiment.

FIG. 5 is an example schematic diagram of a content generator 130 according to an embodiment. The content generator 130 includes, according to an embodiment, a processing circuitry 510 coupled to a memory 520, a storage 530, and a network interface 540. In an embodiment, the components of the content generator 130 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the content generator 130 with communication with, for example, the network 120, the content server 140, the content database 145, and the like, according to an embodiment.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improving traffic of a webpage, comprising:
   receiving a first plurality of activity records respective of a webpage, the webpage including a plurality of content objects, each content object including a markup language code;
   generating a first metric value based on the first plurality of activity records;
   generating a benchmark value;
   generating, in response to determining that the first metric value is below the benchmark value, an alternative webpage based on the plurality of content objects;
   generating a second metric value based on a second plurality of activity records respective of the alternative webpage;
   generating a second alternative webpage in response to determining that the second metric value is lower than the first metric value; and
   replacing the webpage with the alternative webpage, in response to determining that the second metric value is higher than the first metric value.

2. The method of claim 1, wherein generating the alternative webpage further comprises:
   modifying the markup language code of at least a content object of the plurality of content objects.

3. The method of claim 1, further comprising:
   generating a prompt for a large language model (LLM) of a generative AI system, the prompt generated based on a predetermined template and the plurality of content objects; and
   processing the generated prompt utilizing the LLM to generate the alternative webpage.

4. The method of claim 3, further comprising:
   generating a context for the LLM based on any one of: the first plurality of activity records, the second plurality of activity records, and a combination thereof.

5. The method of claim 1, wherein generating the alternative webpage further comprises:
   modifying a content object of the plurality of content objects.

6. The method of claim 5, further comprising:
   detecting a value in the markup language code of the content object; and
   generating a new content object based on modifying the value of the markup language code.

7. The method of claim 1, further comprising:
   detecting in an activity record a user session.

8. The method of claim 7, wherein the user session includes any one of: a number of webpages visited, an amount of time spent on each webpage, an interaction with a content object, a session ID, a heatmap, and any combination thereof.

9. The method of claim 1, further comprising:
   generating the first metric value to detect a conversion rate between interaction with a first content and interaction with a second content, wherein the interaction with the second content is subsequent to the interaction with the first content.

10. The method of claim 1, further comprising:
    generating the benchmark value based on another webpage including content which is semantically similar to a content object of the plurality of content objects.

11. The method of claim 10, further comprising:
determining that the another webpage is semantically similar to the webpage in response to detecting that a semantic distance between the content and the content object is below a predetermined threshold.

12. A non-transitory computer-readable medium storing a set of instructions for improving traffic of a webpage, the set of instructions comprising:
one or more instructions that, when executed by one or more processors of a device, cause the device to:
receive a first plurality of activity records respective of a webpage, the webpage including a plurality of content objects, each content object including a markup language code;
generate a first metric value based on the first plurality of activity records;
generate a benchmark value;
generate, in response to determining that the first metric value is below the benchmark value, an alternative webpage based on the plurality of content objects;
generate a second metric value based on a second plurality of activity records respective of the alternative webpage;
generate a second alternative webpage in response to determining that the second metric value is lower than the first metric value; and
replace the webpage with the alternative webpage, in response to determining that the second metric value is higher than the first metric value.

13. A system for improving traffic of a webpage comprising:
one or more processors configured to:
receive a first plurality of activity records respective of a webpage, the webpage including a plurality of content objects, each content object including a markup language code;
generate a first metric value based on the first plurality of activity records;
generate a benchmark value;
generate, in response to determining that the first metric value is below the benchmark value, an alternative webpage based on the plurality of content objects;
generate a second metric value based on a second plurality of activity records respective of the alternative webpage;
generate a second alternative webpage in response to determining that the second metric value is lower than the first metric value; and
replace the webpage with the alternative webpage, in response to determining that the second metric value is higher than the first metric value.

14. The system of claim 13, wherein the one or more processors, when generating the alternative webpage, are configured to:
modify the markup language code of at least a content object of the plurality of content objects.

15. The system of claim 13, wherein the one or more processors are further configured to:
generate a prompt for a large language model (LLM) of a generative AI system, the prompt generated based on a predetermined template and the plurality of content objects; and
process the generated prompt utilizing the LLM to generate the alternative webpage.

16. The system of claim 15, wherein the one or more processors are further configured to:
generate a context for the LLM based on any one of: the first plurality of activity records, the second plurality of activity records, and a combination thereof.

17. The system of claim 13, wherein the one or more processors, when generating the alternative webpage, are configured to:
modify a content object of the plurality of content objects.

18. The system of claim 17, wherein the one or more processors are further configured to:
detect a value in the markup language code of the content object; and
generate a new content object based on modifying the value of the markup language code.

19. The system of claim 13, wherein the one or more processors are further configured to:
detect in an activity record a user session.

20. The system of claim 19, wherein the user session includes any one of:
a number of webpages visited, an amount of time spent on each webpage, an interaction with a content object, a session ID, a heatmap, and any combination thereof.

21. The system of claim 13, wherein the one or more processors are further configured to:
generate the first metric value to detect a conversion rate between interaction with a first content and interaction with a second content, wherein the interaction with the second content is subsequent to the interaction with the first content.

22. The system of claim 13, wherein the one or more processors are further configured to:
generate the benchmark value based on another webpage including content which is semantically similar to a content object of the plurality of content objects.

23. The system of claim 22, wherein the one or more processors are further configured to:
determine that the another webpage is semantically similar to the webpage in response to detecting that a semantic distance between the content and the content object is below a predetermined threshold.

* * * * *